3,207,663
HEPARIN DERIVATIVES AND PROCESS OF MAKING SAME
Gerard Nomine, Noisy-le-Sec, and Robert Bucourt, Villiers-le-Bel, France, assignors to Roussel-UCLAF, Paris, France, a corporation of France
No Drawing. Filed Feb. 15, 1962, Ser. No. 174,362
Claims priority, application France, Feb. 20, 1961, 853,281
9 Claims. (Cl. 167—74)

The invention relates to the novel compound, the monomethylamide of N-(3,5-dimethylbenzoyl)-N-desulfoheparin and its alkali metal salts. The invention also relates to a process for the preparation of said novel compound and further relates to a method and compositions for the treatment of chronic or post-prandial hyperlipemia.

The said monomethylamide has interesting pharmacological properties, particularly an antilipemic activity and an anti-ulcerous activity. Its antilipemic action is manifest by a clarifying effect on serum and is more marked than that of heparin and is devoid of anticoagulant activity. Additionally, the anti-ulcerous action of the monomethylamide of N-(3,5-dimethylbenzoyl)-N-desulfoheparin is manifest particularly on animals by the prevention of gastric ulcers occasioned by certain therapeutics such as reserpine or even by glucidic fasting.

It is an object of the invention to provide the novel compound, the monomethylamide of N-(3,5-dimethylbenzoyl)-N-desulfoheparin, and its alkali metal salts.

It is a further object of the invention to provide a novel process for the preparation of the monomethylamide of N-(3,5-dimethylbenzoyl)-N-desulfoheparin.

It is an additional object of the invention to provide novel compositions for the treatment of chronic or post-prandial hyperlipemia.

It is another object of the invention to provide a novel method for the treatment of chronic or post-prandial hyperlipemia.

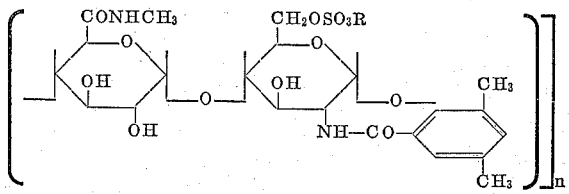

These and other objects and advantages of the invention will become obvious from the following detailed description.

The process for the preparation of the monomethylamide of N-(3,5-dimethylbenzoyl)-N-desulfoheparin comprises reacting an alkali metal salt of N-(3,5-dimethylbenzoyl)-N-desulfoheparin with a high molecular weight quaternary ammonium salt to form the corresponding amine salt of N-(3,5-dimethylbenzoyl)-N-desulfoheparin, reacting the latter dissolved in an inert organic solvent first with ethyl chloroformate and then with methylamine to form the monomethylamide of N-(3,5-dimethylbenzoyl)-N-desulfoheparin which may be recovered or reacted with an alkali metal acetate to form an alkali metal salt of the monomethylamide of N-(3,5-dimethylbenzoyl)-N-desulfoheparin and recovering the said alkali metal salt.

A preferred mode of the process of the invention comprises reacting the sodium salt of N-(3,5-dimethylbenzoyl)-N-desulfoheparin with benzyl dimethyl-2-[2-(p-1,1,3,3-tetramethylbutyl-phenoxy)-ethoxy]-ethyl ammonium chloride (Hyamine 1622) to form the corresponding Hyamine salt of N-(3,5-dimethylbenzoyl)-N-desulfoheparin, reacting the latter dissolved in tetrahydrofuran first with ethyl chloroformate and then with methylamine to form the monomethylamide of N-(3,5-dimethylbenzoyl)-N-desulfoheparin, reacting the latter with sodium acetate to form the sodium salt of the monomethylamide of N-(3,5-dimethylbenzoyl)-N-desulfoheparin and recovering the latter.

Examples of suitable high molecular weight quaternary ammonium compounds capable of reacting with alkali metal salts of N-(3,5-dimethylbenzoyl)-N-desulfoheparin are Hyamine 2389 described in the "Index of Modern Sulfonated Oils and Detergents" (Vol. II) by J. P. Sisley, page 373, as being the chloride of a quaternary ammonium base, "Cequartyl BE" mentioned on page 287 of the Index as being "based on ammonium salts," "Arquad 2C" which according to page 261 of the Index is said to be dilauryl dimethyl ammonium chloride and "Zephirol" which is said on page 286 to be alkyl dimethyl benzyl ammonium chloride. A preferred high molecular weight quaternary ammonium compound is benzyl dimethyl-2-[2-(p-1,1,3,3-tetramethylbutyl-phenoxy)-ethoxy]-ethyl ammonium chloride having the empirical formula $$C_{27}H_{42}ClNO_2 \cdot H_2O$$

and the structural formula:

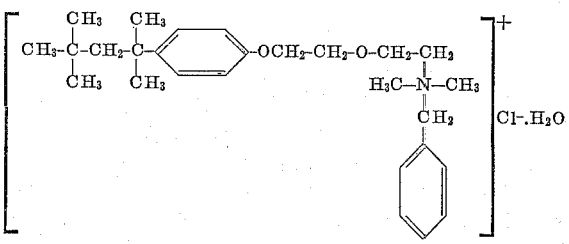

hereafter referred to by its commercial name "Hyamine 1622."

The monomethylamide of N-(3,5-dimethylbenzoyl)-N-desulfoheparin has the probable structural formula:

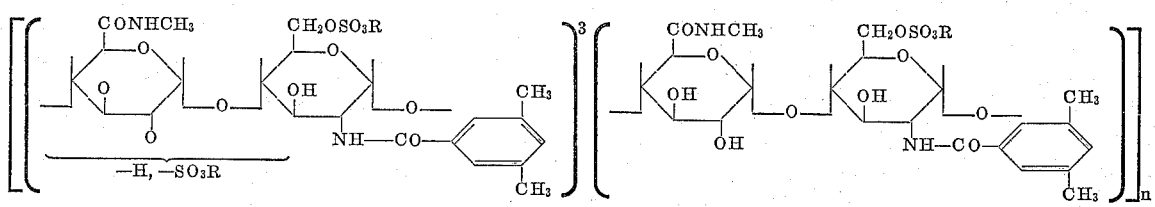

wherein R is hydrogen or an alkali metal atom. The sodium salt of the said monomethylamide occurs in the form of a colorless microcrystalline powder soluble in water, dilute aqueous acids and dilute aqueous alkalis, insoluble in alcohol, ether, acetone, benzene and chloroform. Its specific rotation is $[\alpha]_D^{20} = +89°$ (c.=0.5% in water).

The method of treating hyperlipemia without anti-coagulant side effects comprises administering daily a safe, effective amount of a member of the group consisting of the monomethylamide of N-(3,5-dimethylbenzoyl)-N-desulfoheparin and its alkali metal salts. The usual useful unit of dosage is 50 to 100 mg. and a total daily dosage of 50 to 200 mg. per day.

The compositions of the invention for treating hyperlipemia without anti-coagulant side effects comprise a member of the group consisting of the monomethylamide of N-(3,5-dimethylbenzoyl)-N-desulfoheparin and its alkali metal salts and a pharmaceutical carrier.

The compositions may be administered by oral methods, transcutaneous methods, rectal methods or by intramuscular or intravenous injections. They may be in the form of injectable aqueous solutions dispensed in ampules or multipledose flacons, or in the form of tablets and suppositories prepared by usual procedures.

In the following example there are described several preferred embodiments to illustrate the invention. However, it should be understood that the invention is not intended to be limited to the specific embodiments.

EXAMPLE I

Step A.—N-(3,5-dimethylbenzoyl)-N-desulfoheparin Hyamine 1622 salt 10 g. of the sodium salt of N-(3,5-dimethylbenzoyl)-N-desulfoheparin were dissolved in 50 cc. of distilled water and 300 cc. of a solution of Hyamine 1622 were added under agitation. The colorless precipitate which appeared was recovered by filtration, washed with water and dried under vacuum. 26.61 g. of the Hyamine 1622 salt of N-(3,5-dimethylbenzoyl)-N-desulfoheparin were obtained.

Step B.—Amidification 26. g. of the Hyamine 1622 salt of N-(3,5-dimethylbenzoyl)-N-desulfoheparin, prepared as above, and 520 cc. of tetrahydrofuran were introduced into a balloon flask having three necks. The mixture was agitated until solution was complete. The solution was then brought to about $-10°$ C. and 9.6 cc. of ethyl chloroformate were added. The mixture was agitated for a period of 15 minutes while maintaining it at a temperature of $-10°$ C.

Next, methylamine was allowed to bubble therethrough for a period of 45 minutes. A white precipitate appeared. The reaction mixture was brought to dryness by distillation under vacuum. The dry residue was taken up with 250 cc. of butanol saturated with water and 40 cc. of a 20% aqueous solution of sodium acetate. The mixture was again dried and then taken up in a solution of 66 g. of sodium acetate in 700 cc. of methanol. A white precipitate was obtained which was allowed to stand for several hours and then was separated by decantation. The precipitate was washed three times with 25 cc. of alcohol.

Step C.—Isolation of the sodium salt

The precipitate obtained was placed in suspension in 175 cc. of a 20% aqueous solution of sodium acetate. The suspension was agitated for a period of 1 hour in order to complete solution. 0.750 g. of activated carbon and 1.50 g. of a special filtration clay sold under the name of "Tonsil Optimum" were added to the solution which remained opalescent. The solution was agitated for 20 minutes at room temperature and then was filtered. The filter was rinsed with a small amount of water and the wash water was combined with the filtrate. This solution was poured into 1,250 cc. of ethanol. A precipitate appeared which was allowed to stand overnight. The top liquor was decanted off and the solid product taken up with a little amount of ethanol. The mixture was filtered, washed again with alcohol and dried.

3.07 g., being 30% of the theoretical, of the sodium salt of the monomethylamide of N-(3,5-dimethylbenzoyl)-N-desulfoheparin were thus obtained.

The said sodium salt of the monomethylamide of N-(3,5-dimethylbenzoyl)-N-desulfoheparin occurred in the form of a colorless, microcrystalline powder soluble in water, dilute aqueous acids and dilute aqueous alkalis, insoluble in alcohol, ether, acetone, benzene and chloroform. Its rotary power was $[\alpha]_D^{20} = +89°$ (c.=0.5% in water).

Anticoagulant activity "in vitro" _____ 1.9 u./mg.
Antilipemic activity "in vitro" _____ About 60 u./mg.
Antilipemic activity "in vivo" _____ About 165 u./mg.

The antilipemic unit as defined by Plotka et al. (Arch. Int. Pharmacodyn., vol. 126 (1960), p. 143) corresponds to the 150th part of the clarifying activity of a control heparin testing 150 anticoagulant units in a milligram.

Amount of methylamine after hydrolysis: Found: 4.7% (theoretical 4.72%)

U.V. spectra (ethanol+propyleneglycol+methylene chloride+water as solvent):

$$\lambda_{max.} \text{ at } 240 \text{ m}\mu, E_{1\,cm.}^{1\%} = 144$$

$$\lambda_{max.} \text{ at } 282 \text{ m}\mu, E_{1\,cm.}^{1\%} = 13.5$$

The absorption at 240 m$\mu$ corresponds to $1.52 \times 10^{-3}$ molecules/gram of the

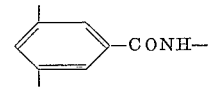

group (theoretical $1.515 \times 10^{-3}$ molecules/gram).

This compound is new.

Analysis.—$(C_{88}H_{113}O_{61}N_8S_7Na_7)_n$;

molecular weight=$(2,644.30)_n$

Calculated: C, 39.97%; H, 4.3%; N, 4.23%
Found: C, 39.8%; H, 4.5–4.9%; N, 3.9–4.0%

The starting compound N-(3,5-dimethylbenzoyl)-N-desulfoheparin was prepared according to the process described in Comptes Rendus of the Academy of Sciences, vol. 247 (1958), pp. 1521–1523.

DETERMINATION OF THE ANTILIPEMIC ACTION "IN VIVO"

(1) Action on Dogs Rendered Hyperlipemic

A post-prandial hyperlipemia was provoked in dogs by ingestion of 10 g./kg. of fresh cream. Five hours after the ingestion, the lipemia was at a maximum and the medicine was injected in solution in physiological serum.

At a dose of 5$\gamma$/kg., the clarification was very weak. At a dose of 10 $\gamma$/kg., the clarifying effect caused a 25% diminution of the plasmatic turbidity 5 minutes after the injection and for a duration of 15 minutes. At a dose of 25 $\gamma$/kg., the clarifying effect caused a diminution of the plasmatic turbidity of 35% after 5 minutes and of 40% after 10 minutes. The clarifying effect was maintained for a duration of 20 minutes.

(2) Determination of the Free Clarifying Factor in Normal Dogs

The antilipemic activity in normal dogs was evaluated as a measure of the free clarifying factor in the blood of the animal, 30 minutes, 1 hour, 2 hours and 3 hours after injection by intravenous methods of 2 mg./kg. of the monomethylamide of N-(3,5-dimethylbenzoyl)-N-desulfoheparin. 0.20 cc. of a homogeneous and stable suspension containing 1% of coconut oil sold under the nane of Ediol (Schenlabs) and 0.80 cc. of the citrated plasma of dogs treated under the condtiions indicated were placed in contact in a water bath at 37° C. The turbidity of the mixture was read immediately with a photometer (initial turbidity), then every 10 minutes. The turbidities read after different times of incubation are expressed in percentage of the initial turbidity.

The operation was repeated with a sample of plasma of the same animal taken before injection of the compound to be studied to serve as a control. The eventual clarifications stated for the control plasma after the various times of incubation were deducted from the clarifications observed with the treated plasmas.

RESULTS

The table herebelow shows the clarifying effects noted with the different withdrawn samples of blood after 130 minutes of incubation on a water bath at 37° C.

| Withdrawals | Time after injection | | | |
|---|---|---|---|---|
| | 30 min. | 1 hour | 2 hours | 3 hours |
| Clarification | 65% after 130 min. | 55% after 130 min. | 25% after 130 min. | 12% after 100 min. |

Under the same conditions, an equal dose of sodium heparinate caused a clarification of 70% after 130 minutes of incubation for the withdrawal made 30 minutes after injection and of 70% after 130 minutes of incubation for the withdrawal made 1 hour after injection.

(3) Clarifying Effect on Dogs by Oral Administration 10 g. of fresh cream per kg. were administered orally to a group of dogs. Four and a half hours after this ingestion, the animals were made to eat 2 mg./kg. or 5 mg./kg. of the sodium salt of the methylamide of N-(3,5-dimethylbenzoyl)-N-desulfoheparin. Withdrawals of blood made 30 minutes, 1 hour and 2 hours after this administration allowed the study of the clarifying effect. The results are given in the following table.

| Animals | Doses, mg./kg. | Turbidity in percent of the initial turbidity after: | | |
|---|---|---|---|---|
| | | 30 min. | 60 min. | 120 min. |
| Controlled lot | 0 | 122 | 133 | 182 |
| Treated lot | 2 | 117 | 154 | 139 |
| | 5 | 57 | 80 | 119 |

HYPOLIPEMANT AND HYPOCHOLESTEROLEMANT ACTION ON ANIMALS TREATED WITH TRITON WR 1339

This test was made on rats made strongly hyperlipemic and hypercholesterolemic by intravenous injection of a solution of Triton WR 1339 (oxethylated tertiary octylphenol formaldehyde polymer), used in the dose of 500 mg./kg. The product studied was administered either by intraperitoneal methods for a period of 2 days, the animal receiving the Triton the first day of the test, or by oral methods for a period of 3 days, the animal receiving the Triton the second day of the test. A control lot of animals received physiological serum and Triton under the same conditions.

The withdrawals of blood recovered over an anticoagulant (heparin) were practiced in the two cases 48 hours after the injection of Triton and the dosages or following tests were made in the control animals and in the treated animals:

Plasmatic turbidity
Burstein test
Kunkel test with phenol
Amount of total lipids
Amount of cholesterol.

In a first test, the sodium salt of the monomethylamide of N-(3,5-dimethylbenzoyl)-N-desulfoheparin was injected by intraperitoneal methods into two lots of 5 rats at a dose of 10 mg./kg. administered 3 times a day for 2 days.

In a second test, the action of the sodium salt of the monomethylamide of N-(3,5-dimethylbenzoyl)-N-desulfoheparin was compared to that of heparin. The two products were administered by oral methods to lots of 5 rats in groups of one lot per dose in the following dosages:

For the sodium salt of the monomethylamide of N-(3,5-dimethylbenzoyl)-N-desulfoheparin: 6 times 20 mg./kg. in 3 days;
For heparin: 6 times 20 mg./kg. in 3 days and 6 times 50 mg./kg. in 3 days.

| Treatment | Method of administration | Results expressed in percent of diminution with reference to the controls | | | |
|---|---|---|---|---|---|
| | | Turbidity | Kunkel | Lipids | Cholesterol |
| Methylamide of N-(3,5-dimethylbenzoyl-N-desulfoheparin, 20 mg./kg. per day. | I.P. | −56 | −35 | −46 | −23 |
| Methylamide of N-(3,5-dimethylbenzoyl)-N-desulfoheparin, 40 mg./kg. per day. | Oral | −41 | −40 | −66 | −56 |
| Heparin, 40 mg./kg. per day | do | −60 | −34 | −53 | −41 |
| Heparin, 100 mg./kg. per day | do | −64 | −44 | −69 | −56 |

The results obtained with the sodium salt of the monomethylamide of N-(3,5-dimethylbenzoyl)-N-desulfoheparin, whether by intraperitoneal methods or by oral methods, show its clear antilipemant and anticholesterolemant action. With the exception of the plasmatic turbidity this compound is shown by oral methods to be clearly more active than heparin.

ANTIULCEROUS ACTION

Effect on Gastric Ulcers Provoked by Reserpine 1 mg./kg. of reserpine was administered daily to two lots of 15 rats by subcutaneous methods for a period of 5 days. One of the lots received a daily subcutaneous injection of 10 mg./kg. of the sodium salt of the monomethylamide of N-(3,5-dimethylbenzoyl)-N-desulfoheparin and the other lot received, under the same conditions, physiological serum in the amount of 1 cc./kg. After 5 days of treatment, the rats were sacrificed and the stomachs were separated, washed and spread out. The ulcers present were noted according to their frequency from 0 to +++.

For the control lot, there was noted a total of 18+ for 15 rats. For the lot treated with the sodium salt of the monomethylamide of N-(3,5-dimethylbenzoyl)-N-desulfoheparin, there was noted a total of 8+ for 15 rats. The frequency for the treated lot is thus 45% with reference to the control lot.

Effect on Gastric Ulcers Provoked by Fasting and Hydrocortisone

Two lots of 10 rats each received daily a subcutaneous injection of 15 mg./kg. of hydrocortisone in suspension in an aqueous vehicle. One of these lots received simultaneously a subcutaneous injection of 10 mg./kg. of the sodium salt of the monomethylamide of N-(3,5-dimethylbenzoyl)-N-desulfoheparin while the other lot received an equal volume of physiological serum. The treatment was followed for 4 days and then the animals were sacrificed. The stomachs were taken, washed and spread out. The ulcers present were noted according to their frequency from 0 to +++.

For the control lot, a total of 20+ were obtained for 10 rats. For the treated lot, there were noted 12+ for 10 rats. The frequency of the treated lot is thus 60% of that of the control lot.

The conclusion that the sodium salt of the monomethylamide of N-(3,5-dimethylbenzoyl)-N-desulfoheparin exercises a clear anti-ulcerigenic action may be drawn from these two tests.

DETERMINATION OF TOXICITY

Acute Toxicity

The product was placed in suspension in a physiological serum at a concentration of 50 mg./cc. and injected by intravenous methods in a volume of 0.01 cc., 0.015 cc., and 0.02 cc. per gram, being a dose of 500 mg./kg., 750 mg./kg., and 1 g./kg., to lots of 5 mice of the Rockland strain weighing between 18 and 22 g. The animals were placed under observation. One death was noted after 24 hours with a dose of 1 g./kg. No symptoms of intoxication were observed in the two hours which followed the injection. The product is thus deprived of toxicity even at a dose of 750 mg./kg.

Various modifications of the process and compositions of the invention may be made without departing from the spirit or scope thereof, and it is to be understood that the invention is to be limited only as defined in the appended claims.

We claim:

1. A compound selected from the group consisting of the monomethylamide of N-(3,5-dimethylbenzoyl)-N-desulfoheparin and its alkali metal salts.
2. The monomethylamide of N-(3,5-dimethylbenzoyl)-N-desulfoheparin.
3. The sodium salt of the monomethylamide of N-(3,5-dimethylbenzoyl)-N-desulfoheparin.
4. A process for the preparation of the monomethylamide of N-(3,5-dimethylbenzoyl)-N-desulfoheparin which comprises reacting an alkali metal salt of N-(3,5-dimethylbenzoyl)-N-desulfoheparin with a high molecular weight quaternary ammonium salt to form the corresponding insoluble amine salt of N-(3,5-dimethylbenzoyl)-N-desulfoheparin, reacting the latter with ethyl chloroformate and then methylamine to form the monomethylamide of N-(3,5-dimethylbenzoyl)-N-desulfoheparin and recovering the latter.
5. A process for the preparation of an alkali metal salt of the monomethylamide of N-(3,5-dimethylbenzoyl)-N-desulfoheparin which comprises reacting an alkali metal salt of N-(3,5-dimethylbenzoyl)-N-desulfoheparin with a high molecular weight quaternary ammonium salt in water to form the corresponding insoluble amine salt of N-(3,5-dimethylbenzoyl)-N-desulfoheparin, reacting the latter with ethyl chloroformate and then methylamine to form the monomethylamide of N-(3,5-dimethylbenzoyl)-N-desulfoheparin, reacting the latter with an alkali metal acetate to form the corresponding alkali metal salt of the monomethylamide of N-(3,5-dimethylbenzoyl)-N-desulfoheparin and recovering the latter.
6. The process of claim 5 wherein the alkali metal acetate is sodium acetate.
7. The process of claim 5 wherein the alkali metal salt of N-(3,5-dimethylbenzoyl)-N-desulfoheparin is the sodium salt.
8. A composition for the treatment of hyperlipemia without anti-coagulant side effects which comprises 50 to 100 mg. of a compound selected from the group consisting of the monomethylamide of N-(3,5-dimethylbenzoyl)-N-desulfoheparin and its alkali metal salts and a pharmaceutical carrier.
9. The composition of claim 8 wherein the compound is the sodium salt of the monomethylamide of N-(3,5-dimethylbenzoyl)-N-desulfoheparin.

No references cited.

JULIAN S. LEVITT, *Primary Examiner.*
FRANK CACCIAPAGLIA, Jr., LEWIS GOTTS,
*Examiners.*